(12) United States Patent
Groarke

(10) Patent No.: US 11,763,300 B2
(45) Date of Patent: Sep. 19, 2023

(54) METHOD AND SYSTEM FOR CURRENCY-AGNOSTIC REAL-TIME SETTLEMENT

(71) Applicant: MASTERCARD INTERNATIONAL INCORPORATED, Purchase, NY (US)

(72) Inventor: Peter J. Groarke, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 380 days.

(21) Appl. No.: 16/520,491

(22) Filed: Jul. 24, 2019

(65) Prior Publication Data

US 2021/0027293 A1 Jan. 28, 2021

(51) Int. Cl.
*G06Q 20/38* (2012.01)
*G06Q 20/40* (2012.01)
*H04L 9/14* (2006.01)

(52) U.S. Cl.
CPC ....... *G06Q 20/3829* (2013.01); *G06Q 20/401* (2013.01); *H04L 9/14* (2013.01); *G06Q 2220/00* (2013.01); *H04L 2209/56* (2013.01)

(58) Field of Classification Search
CPC ..... G06Q 20/3829; G06Q 20/401; H04L 9/14
USPC .......................................................... 705/71
See application file for complete search history.

(56) References Cited

U.S. PATENT DOCUMENTS

| 11,455,642 | B1* | 9/2022 | Jameson | G06Q 20/405 |
|---|---|---|---|---|
| 2018/0322485 | A1* | 11/2018 | Jayaram | G06Q 20/22 |
| 2018/0330342 | A1* | 11/2018 | Prakash | G06Q 20/065 |
| 2019/0034888 | A1* | 1/2019 | Grassadonia | G06Q 20/20 |
| 2019/0114182 | A1* | 4/2019 | Chalakudi | H04L 9/0618 |
| 2019/0220856 | A1* | 7/2019 | Li | G06Q 20/40 |
| 2019/0289019 | A1* | 9/2019 | Thekadath | H04L 9/3239 |
| 2019/0303931 | A1* | 10/2019 | Valencia | G06Q 20/02 |
| 2019/0392437 | A1* | 12/2019 | Castagna | G06F 16/288 |
| 2020/0167769 | A1* | 5/2020 | Green | G06Q 20/3825 |
| 2020/0226558 | A1* | 7/2020 | Castinado | H04L 67/1095 |
| 2020/0272767 | A1* | 8/2020 | Dunjic | H04L 9/3247 |
| 2020/0273043 | A1* | 8/2020 | Murphy | G06Q 40/02 |
| 2020/0302407 | A1* | 9/2020 | Willis | G06Q 20/102 |
| 2020/0311724 | A1* | 10/2020 | Dunjic | H04L 9/30 |

* cited by examiner

*Primary Examiner* — Courtney P Jones
(74) *Attorney, Agent, or Firm* — PANITCH SCHWARZE BELISARIO & NADEL LLP

(57) ABSTRACT

A method for real-time settlement of financial institutions for a standard electronic payment transaction using a blockchain network includes: receiving a response message for a financial transaction from an issuing institution via payment rails including a transaction amount, issuer identifier, and acquirer identifier; identifying a public key using the acquirer identifier and a private key using the issuer identifier; generating a destination address using the public key and a digital signature using the private key; transmitting a blockchain transaction request to a node in a blockchain network using an alternative communication network including the destination address, digital signature, and transaction amount; receiving a confirmation message from the node including a transaction hash value; modifying the response message to include the transaction hash value; and transmitting the modified response message to an acquiring institution using the payment rails.

20 Claims, 7 Drawing Sheets

METHOD AND SYSTEM FOR CURRENCY-AGNOSTIC REAL-TIME SETTLEMENT

FIELD

The present disclosure relates to currency-agnostic real-time settlement of financial institutions, specifically the use of a blockchain to provide for real-time settlement between financial institutions using an agreed-upon currency that may vary from the currency used in the initial transaction upon which the settlement is based.

BACKGROUND

Traditionally, card-based payment systems rely on deferred net settlement (DNS) for settlement between financial institutions. DNS involves aggregating all activity for financial institutions over a period of time (commonly 24 hours), determining the net position for each financial institution at the end of the period, and then having each financial institution pay or be paid accordingly for a settling of accounts. As an overall process, DNS is useful in that it reduces overall network traffic and therefore the cost of settlement, and can be convenient for the billing of fees and other services that can be levied at the same time.

However, DNS also has a number of drawbacks. First, financial institutions are typically required to keep accounts with a suitable amount of currency for all possible settlements and currencies, which results in a large amount of wealth sitting idle for an institution, and thereby being unable to be used or invested. Second, every transaction that occurs between settlement periods carries a risk that settlement may fail, resulting in a payee not receiving payment. Third, because of this risk, payers are often required to provide collateral to cover their transactions during the period, which can be difficult or inconvenient for some institutions to provide.

Thus, there is a need for a solution to provide settlement for financial institutions in real-time, but without the negative effects of adding a considerable number of additional messages and transactions to traditional payment networks.

SUMMARY

The present disclosure provides a description of systems and methods for real-time settlement of financial institutions for a standard electronic payment transaction using a blockchain network. A response message for a card-based payment transaction is intercepted by a processing system, which identifies addresses for each involved financial institution on an alternative blockchain network. A blockchain transaction is conducted, submitted either by the issuing financial institution directly or the processing system on behalf thereof, with the processing system receiving evidence of the transaction. The processing system confirms that the blockchain transaction matches the card-based transaction, and then modifies the response message to inform the acquiring financial institution of the settlement. The response message is then provided to the acquiring financial institution as normal, with the indication that settlement was already performed in real-time. As a result, settlement can occur at or near real-time for a card-based transaction, without additional messaging on traditional payment networks and reducing the risk and liability of financial institutions.

A method for real-time settlement of financial institutions for a standard electronic payment transaction using a blockchain network includes: receiving, by a receiver of a processing server, a response message for a financial transaction from an issuing financial institution transmitted using payment rails, the response message including at least a transaction amount, issuer identification value, and acquirer identification value; executing, by a processing device of the processing server, a query on a memory of the processing server to identify a public key associated with the acquirer identification value; generating, by the processing device of the processing server, a destination address using the identified public key; transmitting, by a transmitter of the processing server, a settlement request to the issuing financial institution using an alternative communication network, the settlement request including at least the destination address, the transaction amount, and a transaction reference value; receiving, by the receiver of the processing server, a transaction hash value from the issuing financial institution in response to the settlement request; modifying, by the processing device of the processing server, the response message to include the received transaction hash value and/or confirmation data based on the received transaction hash value; and transmitting, by the transmitter of the processing server, the modified response message to an acquiring financial institution using the payment rails.

Another method for real-time settlement of financial institutions for a standard electronic payment transaction using a blockchain network includes: receiving, by a receiver of a processing server, a response message for a financial transaction from an issuing financial institution transmitted using payment rails, the response message including at least a transaction amount, issuer identification value, and acquirer identification value; executing, by a processing device of the processing server, a query on a memory of the processing server to identify a public key associated with the acquirer identification value and a private key associated with the issuer identification value; generating, by the processing device of the processing server, a destination address using the identified public key and a digital signature using the identified private key; transmitting, by a transmitter of the processing server, a blockchain transaction request to a node in a blockchain network using an alternative communication network, the blockchain transaction request including at least the destination address, digital signature, transaction amount, and a transaction reference value; receiving, by the receiver of the processing server, a confirmation message from the node in the blockchain network, the confirmation message including a transaction hash value and/or confirmation data; modifying, by the processing device of the processing server, the response message to include the received transaction hash value and/or confirmation data; and transmitting, by the transmitter of the processing server, the modified response message to an acquiring financial institution using the payment rails.

A system for real-time settlement of financial institutions for a standard electronic payment transaction using a blockchain network includes: a receiver of a processing server configured to receive a response message for a financial transaction from an issuing financial institution transmitted using payment rails, the response message including at least a transaction amount, issuer identification value, and acquirer identification value; a processing device of the processing server configured to execute a query on a memory of the processing server to identify a public key associated with the acquirer identification value, and generate a destination address using the identified public key; and a transmitter of the processing server configured to transmit a settlement request to the issuing financial institution using an alternative communication network, the settlement request including at least the destination address, the transaction amount, and a transaction reference value, wherein the receiver of the processing server is further configured to receive a transaction hash value from the issuing financial institution in response to the settlement request; the processing device of the processing server is further configured to modify the response message to include the received transaction hash value and/or confirmation data based on the received transaction hash value; and the transmitter of the processing server is further configured to transmit the modified response message to an acquiring financial institution using the payment rails.

Another system for real-time settlement of financial institutions for a standard electronic payment transaction using a blockchain network includes: a receiver of a processing server configured to receive a response message for a financial transaction from an issuing financial institution transmitted using payment rails, the response message including at least a transaction amount, issuer identification value, and acquirer identification value; a processing device of the processing server configured to execute a query on a memory of the processing server to identify a public key associated with the acquirer identification value and a private key associated with the issuer identification value, and generate a destination address using the identified public key and a digital signature using the identified private key; and a transmitter of the processing server configured to transmit a blockchain transaction request to a node in a blockchain network using an alternative communication network, the blockchain transaction request including at least the destination address, digital signature, transaction amount, and a transaction reference value, wherein the receiver of the processing server is further configured to receive a confirmation message from the node in the blockchain network, the confirmation message including a transaction hash value and/or confirmation data, the processing device of the processing server is further configured to modify the response message to include the received transaction hash value and/or confirmation data, and the transmitter of the processing server is further configured to transmit the modified response message to an acquiring financial institution using the payment rails.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
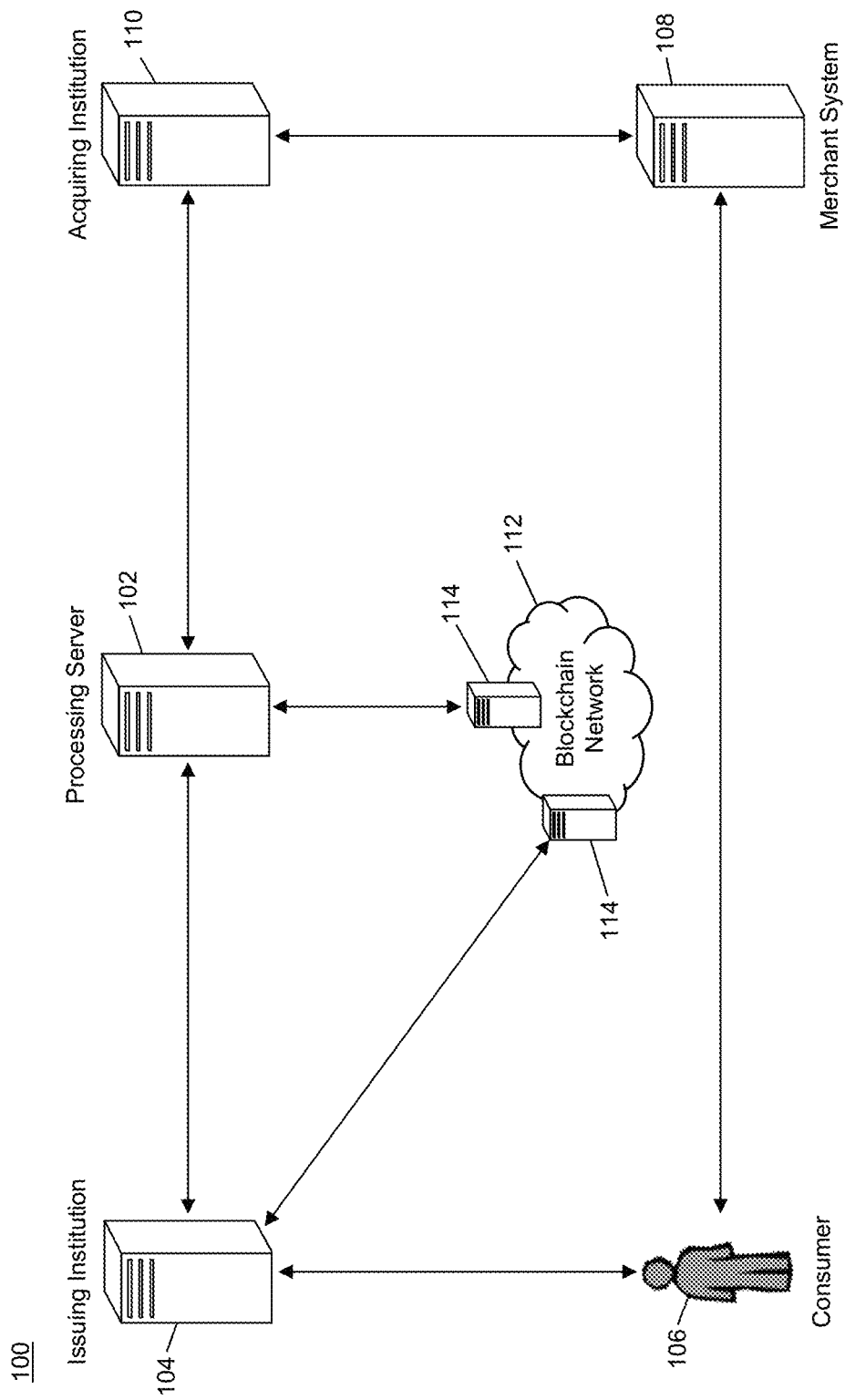
FIG. 1 is a block diagram illustrating a high level system architecture for real-time settlement of financial institutions for a standard electronic payment transaction using a blockchain network in accordance with exemplary embodiments.
Figure 3A:
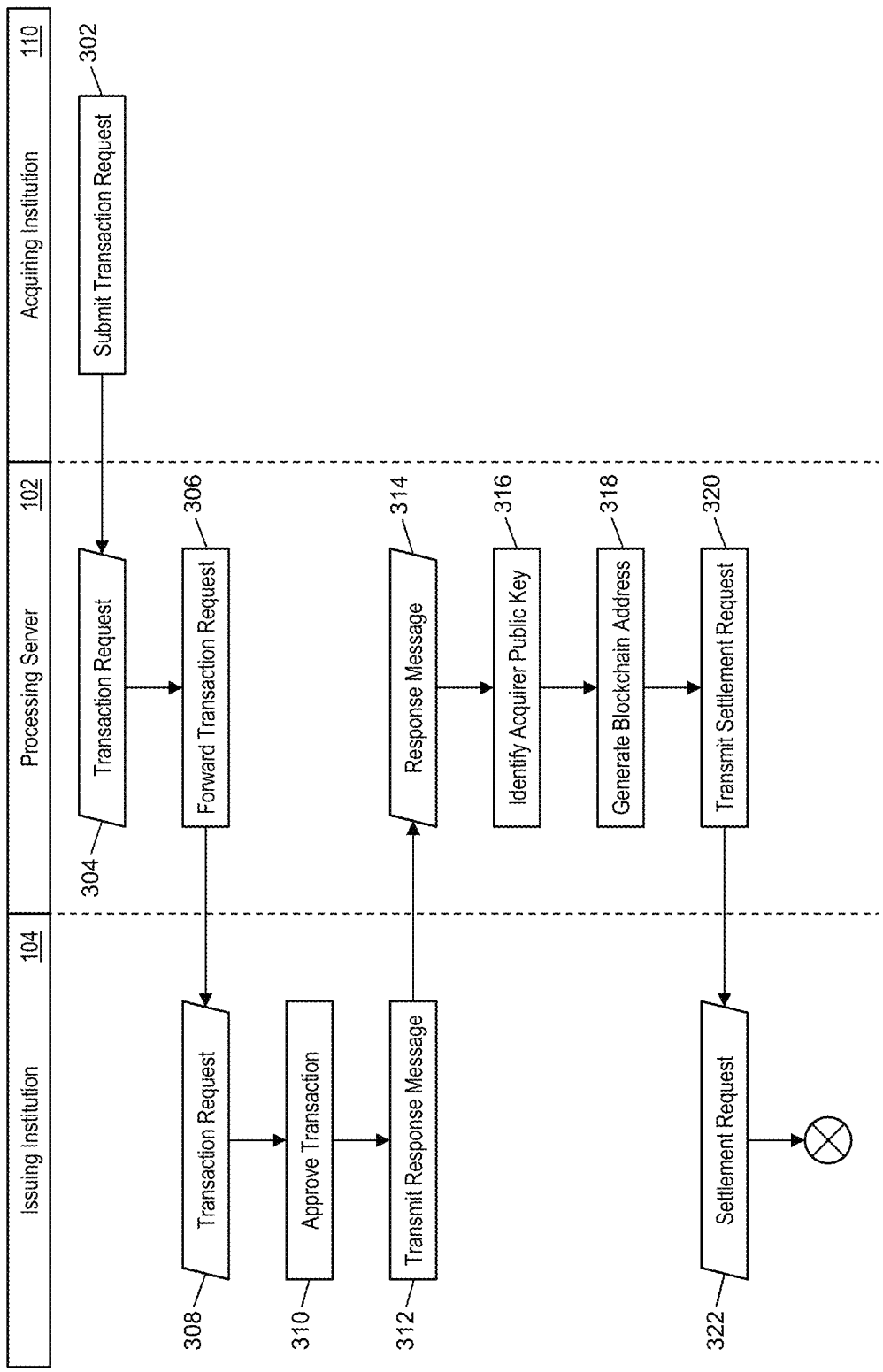
Figure 3B:
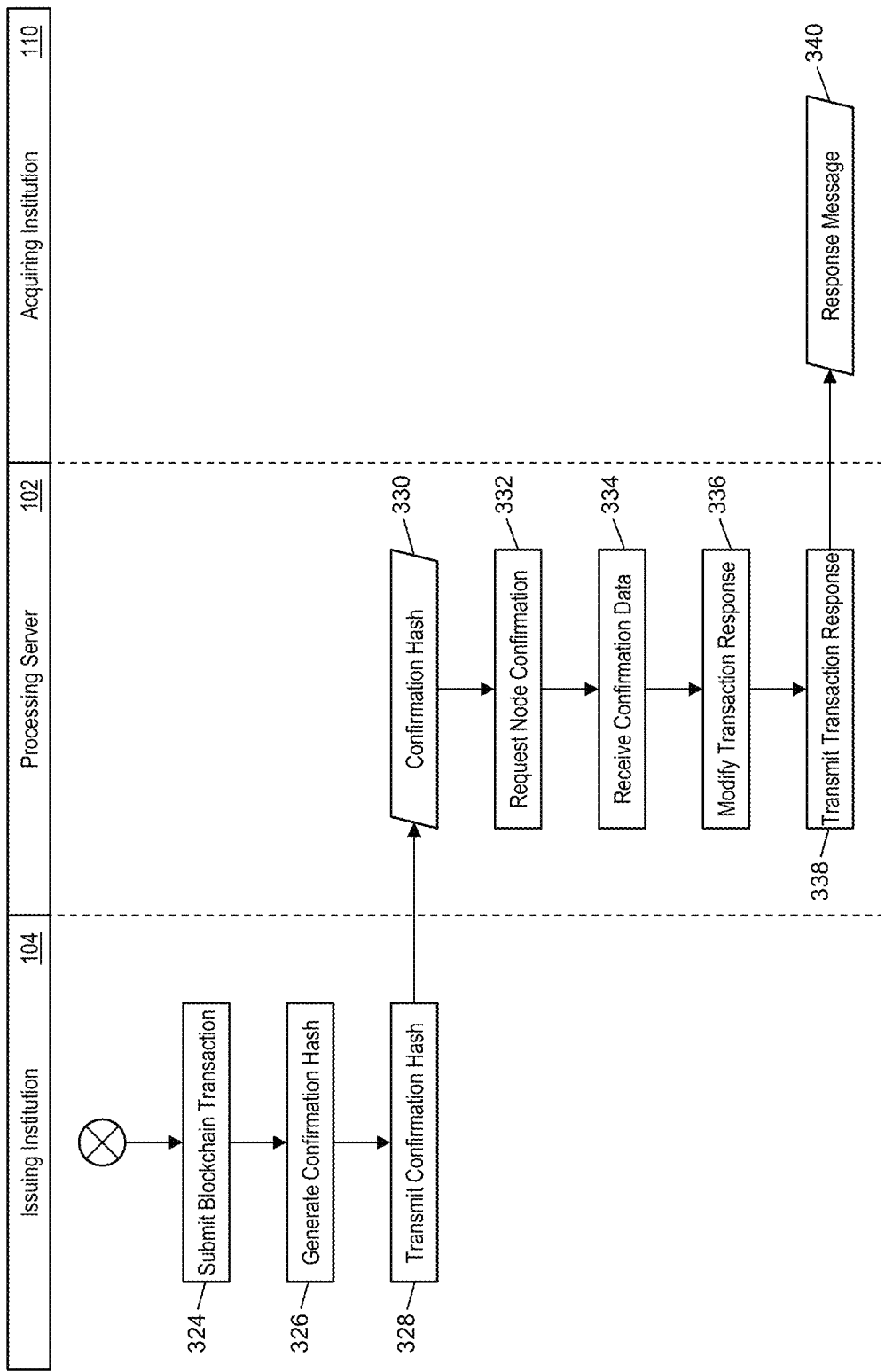
Figure 4:
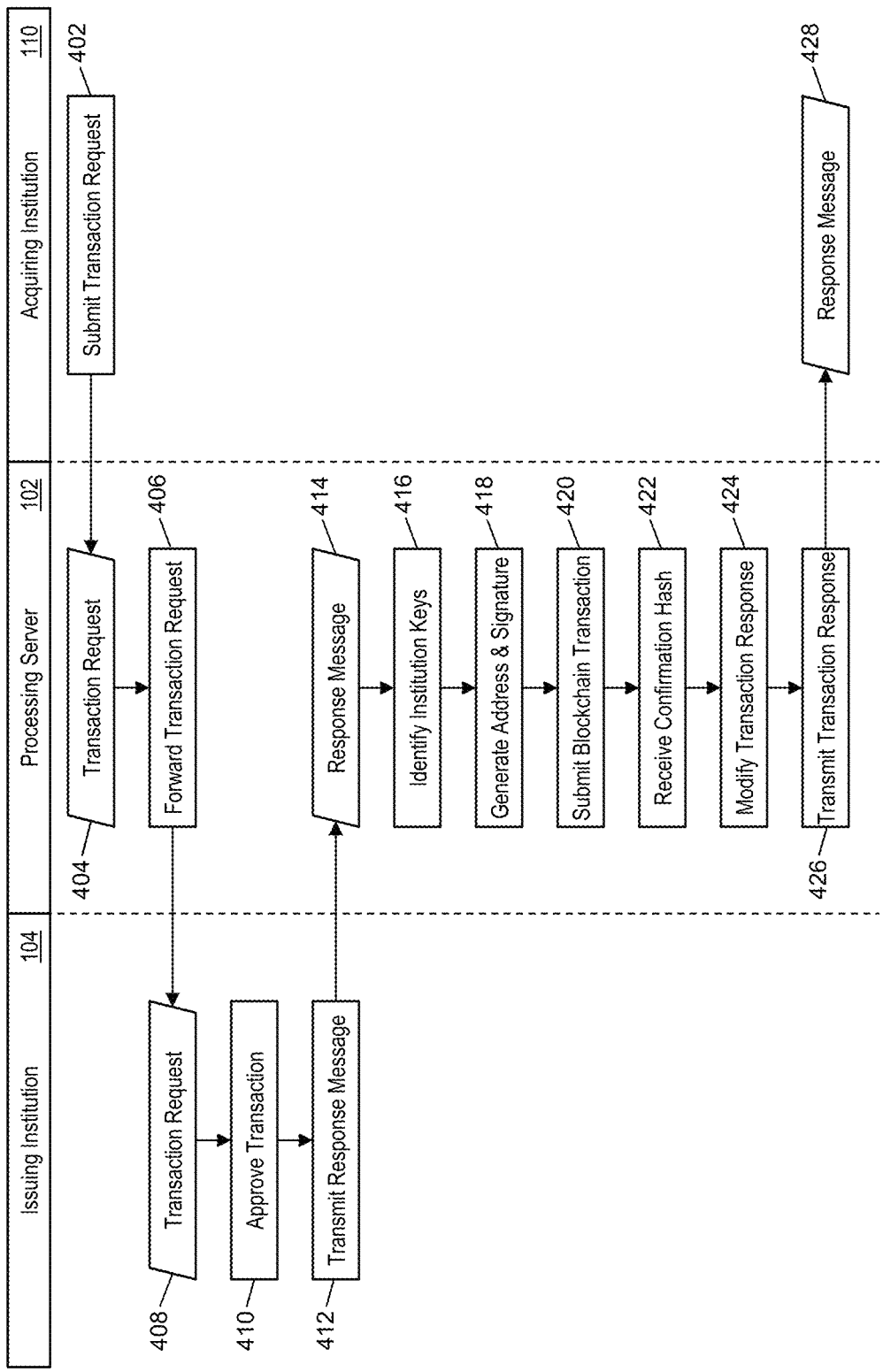

FIGS. 3A, 3B, and 4 are flow diagrams illustrating processes for real-time settlement of financial institutions for a standard electronic payment transaction using a blockchain network in the system of FIG. 1 in accordance with exemplary embodiments.

Figure 5:
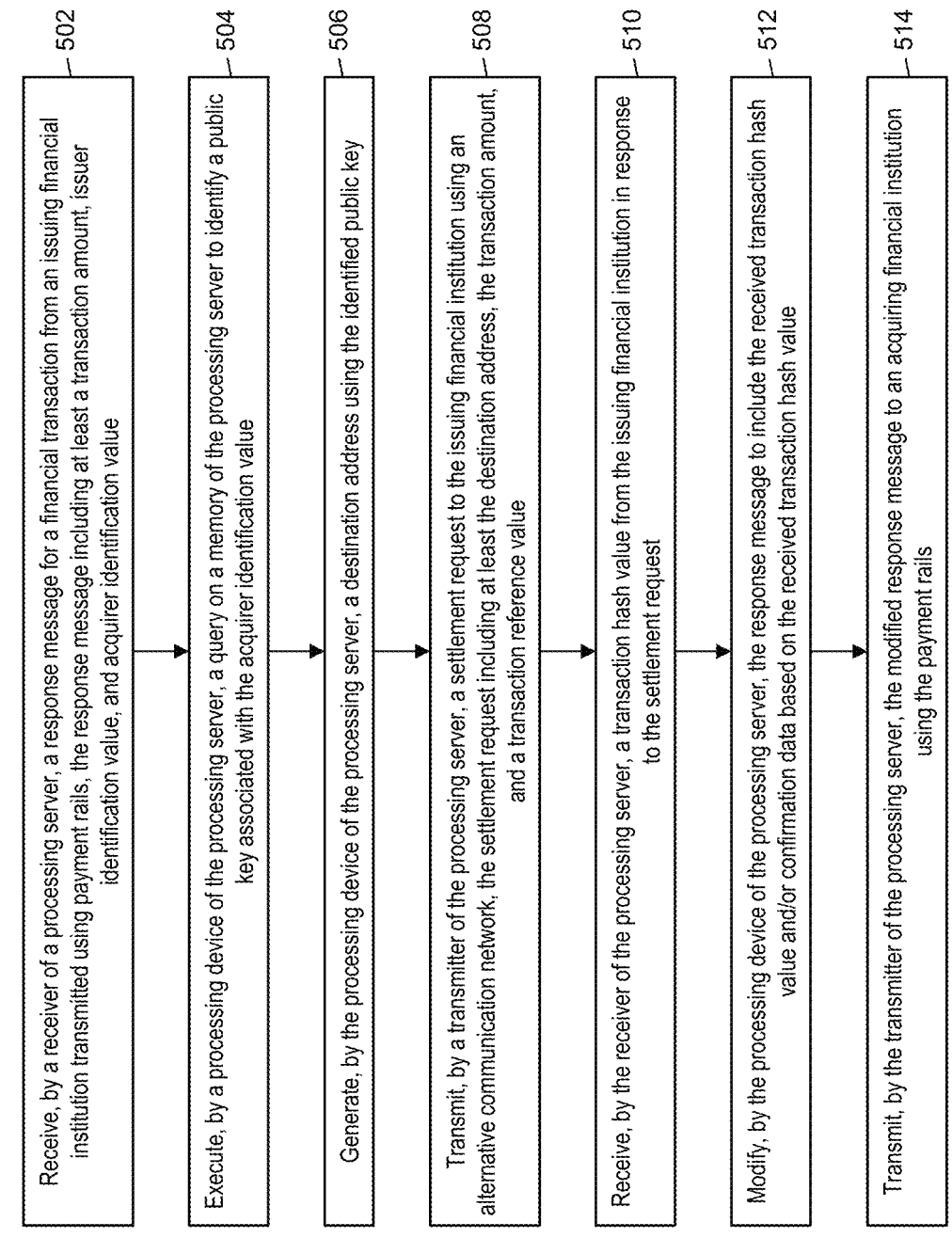

FIG. 5 is a flow chart illustrating an exemplary method for real-time settlement of financial institutions for a standard electronic payment transaction using a blockchain network in accordance with exemplary embodiments.

Figure 6:
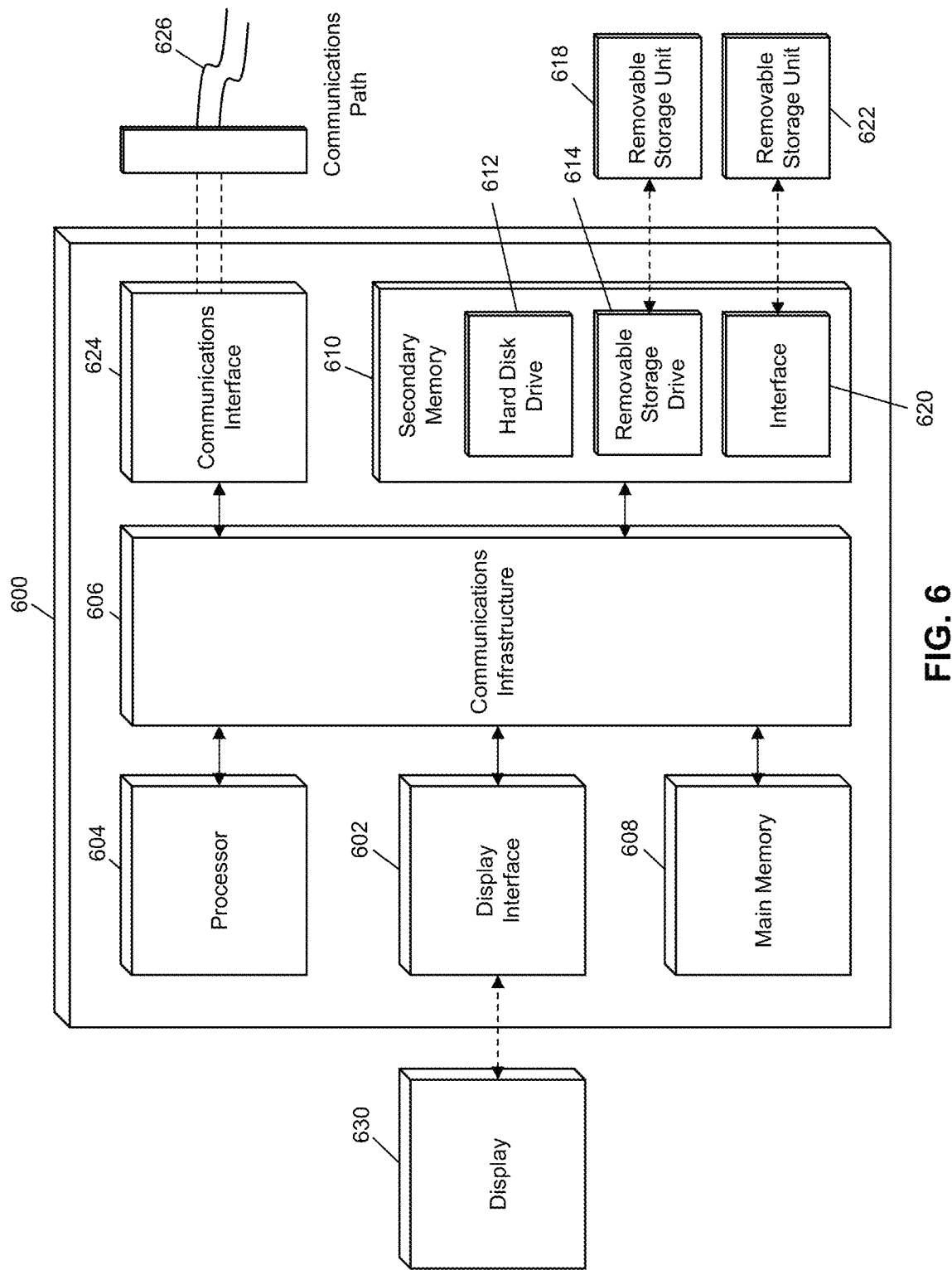

FIG. 6 is a block diagram illustrating a computer system architecture in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A shared ledger of all transactions of a blockchain-based digital asset, such as a cryptographic currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and an asset amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Payment Card—A card or data associated with a transaction account that may be provided to a merchant in order to fund a financial transaction via the associated transaction account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated transaction account (e.g., as stored in a communication device, such as a smart phone or computer). For example, in some instances, data including a payment account number may be considered a payment card for the processing of a transaction funded by the associated transaction account. In some instances, a check may be considered a payment card where applicable.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by Mastercard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

System for Real-Time Settlement of Financial Transactions

FIG. 1 illustrates a system 100 for the real-time settlement of financial institutions for a traditional electronic payment transaction by leveraging the use of a blockchain network.

The system 100 may include a processing server 102. The processing server 102, discussed in more detail below, may be configured to facilitate real-time settlement between an issuing institution 104 and an acquiring institution 110 for a traditional electronic payment transaction using a blockchain network 112. An issuing institution 104, which may be an issuing financial institution, such as an issuing bank, or any other type of entity, may be configured to issue a transaction account to a consumer 106 for use in funding a traditional payment transaction, such as a card-based account. For instance, the issuing institution 104 may issue a credit card account to the consumer 106 and may issue a credit card to the consumer 106 associated therewith that may be presented to merchant systems 108 to convey payment credentials for the associated transaction account.

The acquiring institution 110, which may be an acquiring financial institution, such as an acquiring bank, or any other type of entity, may be configured to issue a transaction account to a merchant associated with the merchant system 108 for use in receiving currency as payment for a traditional payment transaction. In a traditional payment transaction, the merchant system 108 may read the payment credentials from the consumer 106 and may transmit the payment credentials and other transaction data for a payment transaction to their acquiring institution 110, either directly or through one or more intermediate entities, such as a gateway processor. The other transaction data may include a transaction amount and any other data used for a payment transaction, such as a transaction time and/or date, currency type, geographic location, merchant identifier, product data, offer data, loyalty data, reward data, etc. The payment credentials may include at least a primary account number and an issuer identifier, which may be an identification value unique to the issuing institution 104, and any other suitable data, such as an expiration date, security code, transaction counter, cryptogram, etc.

The acquiring institution 110 may receive the transaction data and generate a transaction message for the traditional payment transaction. The transaction message may be a specially formatted data message that is formatted according to a standard governing the exchange of financial transaction messages, such as the International Organization of Standardization's ISO8583 or ISO20022 standards. A transaction message may include a message type indicator indicating a type of the transaction message as set forth in the standard, and may include a plurality of data elements configured to store data as set forth in the standard. Transaction messages may be transmitted via payment rails, which may be specialized network infrastructure managed by or otherwise associated with a payment network, that are configured to facilitate the transmission of formatted transaction messages.

The acquiring institution 110 may generate a transaction message for the standard payment transaction, which may be transmitted to a payment network for processing. In some cases, the acquiring institution 110 may include additional transaction data in the transaction message, such as an acquirer identifier, which may be an identification value unique to the acquiring institution 110. In a traditional payment transaction, the transaction message may be routed to the issuing institution 104, which may approve or deny the transaction and return a response transaction message to the payment network accordingly, for forwarding on to the acquiring institution 110. In the system 100, a processing server 102 may intercept the response message. In some embodiments, the processing server 102 may be part of a payment network and be provided the response message during the appropriate processing step of the payment network. In other embodiments, the processing server 102 may be external to the payment network and may receive the response message from the payment network or the issuing institution 104. In some embodiments, the response message may be an authorization response. In other embodiments, the response message may be an issuer response to a financial request, financial advice, or authorization advice.

The processing server 102 may intercept the response message and identify that real-time settlement is to be performed for the payment transaction. Such an identification may be based on data stored in the response message itself (e.g., a specified data value stored in a predetermined data element) or based on preferences of the involved institution(s). For example, the issuing institution 104 or acquiring institution 110 may be registered with the processing server 102 for real-time settlement, where the processing server 102 may identify the issuing institution 104 and acquiring institution 110 involved in the payment transaction by the identifier values stored in the response message (e.g., in predetermined data elements). In some cases, both the issuing institution 104 and acquiring institution 110 may be required to be registered for real-time settlement for the processing server 102 to perform real-time settlement using the methods discussed herein.

If real-time settlement is to be performed for the transaction, then the processing server 102 may generate a blockchain address for receipt of currency for the acquiring institution 110. The processing server 102 may identify a public key of a cryptographic key pair associated with the acquiring institution 110 for use thereof with the blockchain network 112. In some cases, multiple blockchain networks 112 may be available for use for real-time settlement, such as where each blockchain network 112 utilizes different cryptographic currency or where there are different fiat currency exchanges available for each blockchain network 112. In such cases, the processing server 102 may first identify the blockchain network 112 to be used, such as based on the preferences of the issuing institution 104 and/or acquiring institution 110 or included in the intercepted response message. Once the appropriate public key has been identified, the processing server 102 may generate a recipient address for the blockchain using the acquirer's public key for that blockchain network 112.

Using the blockchain address, a blockchain transaction may be submitted to the blockchain network 112 for real-time settlement of the electronic payment transaction for payment from the issuing institution 104 to the acquiring institution 110 on the blockchain. In some embodiments, the blockchain transaction may be submitted directly by the processing server 102. In such embodiments, the processing server 102 may store a copy of the issuing institution's public and private keys for the blockchain network 112, and may be configured to generate a digital signature for the blockchain transaction itself using the private key. In other embodiments, the issuing institution 104 may submit the blockchain transaction, where the processing server 102 may transmit the destination address and transaction amount for the blockchain transaction to the issuing institution 104 using an alternative communication network separate from the payment rails.

In either instance, a blockchain transaction may be submitted to the blockchain network 112. The blockchain network 112 may be comprised of a plurality of nodes 114. Each node 114 may be a computing system that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. In some embodiments, the processing server 102 may be a node 114 in one or more blockchain networks 112. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 112 prior to the generation and addition of a new block to the blockchain in order for the change to be made permanent. Computational and communication limitations may make such a modification exceedingly difficult, if not impossible, thus rendering the blockchain immutable.

The blockchain may be used to store information regarding blockchain transactions conducted between two different blockchain wallets. A blockchain wallet may include a private key of a cryptographic key pair that is used to generate digital signatures that serve as authorization by a payer (e.g., the issuing institution 104) for a blockchain transaction, where the digital signature can be verified by the blockchain network 112 (e.g., via a node 114 thereof) using the public key of the cryptographic key pair. In some cases, the term "blockchain wallet" may refer specifically to the private key. In other cases, the term "blockchain wallet" may refer to a computing device that stores the private key for use thereof in blockchain transactions, such as the issuing institution 104 storing its own private key or the processing server 102 storing private keys for each issuing institution 104 in such implementations.

Each blockchain data value stored in the blockchain may correspond to a blockchain transaction or other storage of data, as applicable. A blockchain transaction may consist of at least: a digital signature of the sender of currency (e.g., the issuing institution 104) that is generated using the sender's private key, a blockchain address of the recipient of currency (e.g., the acquiring institution 110) generated using the recipient's public key, and a blockchain currency amount that is transferred. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction. For the processing of a blockchain transaction, such data may be provided to a node 114 in the blockchain network 112, either by the sender (e.g., issuing institution 104 or the processing server 102 on behalf thereof) or the recipient. The node 114 may verify the digital signature using the public key in the cryptographic key pair of the sender's wallet and also verify the sender's access to the funds (e.g., that the unspent transactions have not yet been spent and were sent to address associated with the sender's wallet), and then include the blockchain transaction in a new block. The new block may be validated by other nodes 114 in the blockchain network 112 before being added to the blockchain and distributed to all of the nodes 114 in the blockchain network 112.

In the system 100, the issuing institution 104 or processing server 102 may submit the blockchain transaction to a node 114 in the blockchain network 112. The blockchain transaction may include the issuing institution's digital signature, any unspent transaction outputs, the acquiring institution's destination address, and a transaction amount. The transaction amount may be the same amount as stored in the intercepted response message, or may be a different amount based thereon, such as due to an exchange rate from the currency used in the standard payment transaction and the currency used in the blockchain associated with the selected blockchain network 112, and/or due to fees that may be incurred via use of the processing server 102. In some embodiments, the processing server 102 may include a unique identifier for the transaction in the transaction data (e.g., included in the submission to the node 114 by the processing server 102 or provided to the issuing institution 104 for inclusion therein).

The node 114 may receive the blockchain transaction, which may thereby be confirmed and included in a new block that is confirmed and added to the blockchain using traditional methods and systems. Once the transaction has been added to the blockchain, the node 114 may respond with confirmation data. The confirmation data may include the unique identifier for the transaction and/or a hash value that is generated for the transaction via the hashing of the transaction data as posted to the blockchain. The processing server 102 may receive the confirmation data, either from the node 114 directly or from the issuing institution 104, depending on implementation.

The processing server 102 may use the confirmation data to confirm that the blockchain transaction was posted successfully and accurate. If the confirmation data includes the unique identifier, the processing server 102 may poll a node 114 in the blockchain network 112 to identify the transaction hash value for the blockchain transaction that corresponds to the unique identifier. Once the processing server 102 has received the transaction hash value, the processing server 102 may generate its own reference hash value for the transaction by hashing its own transaction data. The processing server 102 may use the same hashing algorithm(s) as the node 114 applied to the same transaction data, as the processing server 102 may have been in possession of all of the transaction data used in the hash (e.g., the public keys, destination address, transaction amount, etc.). The processing server 102 may then compare the hash values to verify that the real-time settlement was performed for the correct transaction data. If the comparison fails, the processing server 102 may troubleshoot the blockchain transaction with the issuing institution 104, such as to determine the cause and attempt to remediate using any suitable method.

If the confirmation is successful, then the processing server 102 may modify the intercepted response message for the traditional payment transaction. Successful confirmation indicates that the settlement was performed in real-time for the traditional payment transaction using the blockchain network 112. The response message may be modified to indicate the settlement accordingly, such as by insertion of the transaction hash value or confirmation data in the response message. In some cases, the data may be inserted into a predetermined data element, such as a predefined data element reserved for private use according to the applicable standard. The modified response message may be forwarded to the acquiring institution 110 using the payment rails. The acquiring institution 110 may then finalize the transaction, by notifying the merchant system 108 of the approval. The merchant system 108 and consumer 106 may resolve the transaction accordingly.

Because the settlement happens in real-time or near real-time during the processing of the traditional payment transaction, no deferred net settlement needs to be performed. In addition, because the issuing institution 104 and acquiring institution 110 are settled immediately, there is no carried risk for either institution, and thus no need for either institution to provide collateral for any such risk. Furthermore, the real-time settlement also enables account balances and credit lines to be updated in real-time as well by the appropriate institutions, enabling the consumer 106 and merchant system 108 to have more accurate and up-to-date accounting for their transaction amounts, without having to wait for traditional net settlement and clearing procedures. In addition, because a blockchain network 112 is used in place of the payment network, the number of transaction messages transmitted on the payment rails is even lower than when deferred net settlement is used, thus reducing the overall strain on the payment rails and keeping costs low for the entities involved. Thus, the methods and systems discussed herein provide a number of advantages over deferred net settlement by use of a blockchain network in conjunction with traditional payment transaction processing using payment rails.

Processing Server

Figure 2:
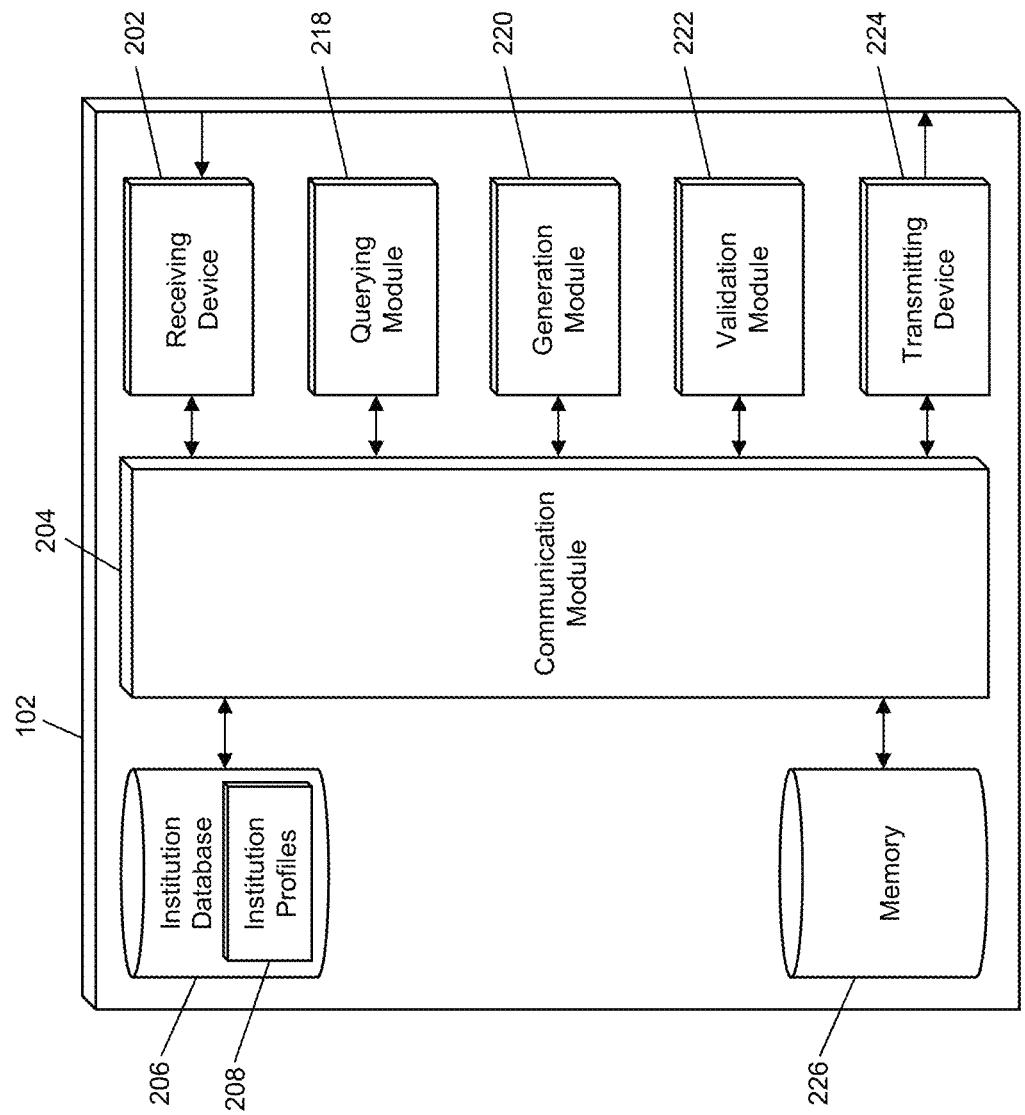
FIG. 2 is a block diagram illustrating the processing server of the system of FIG. 1 for real-time settlement of financial institutions for a standard electronic payment transaction using a blockchain network in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from issuing institutions 104, acquiring institutions 110, nodes 114 of blockchain networks 112, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by issuing institutions 104 and acquiring institutions 110 that are superimposed or otherwise encoded with transaction messages, which may be transmitted via payment rails and include transaction data including payment credentials, transaction amounts, acquirer identifiers, and issuer identifiers. The receiving device 202 may also be configured to receive data signals electronically transmitted by nodes 114 in blockchain networks, which may be superimposed or otherwise encoded with transaction reference identifiers, transaction hash values, or other confirmation data regarding blockchain transactions. The receiving device 202 may also be configured to receive data signals electronically transmitted by issuing institutions 104 and acquiring institutions 110 that are superimposed or otherwise encoded with messages regarding profiles stored with the processing server 102 for use in the functions discussed herein, such as registration of identifiers, registration of public and/or private keys, network preferences, currency preferences, etc.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, validation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may also include an institution database 206. The institution database 206 may be configured to store a plurality of institution profiles 208 using a suitable data storage format and schema. The institution database 206 may be a relational database that utilizes structured query language for the storage, identification, modifying, updating, accessing, etc. of structured data sets stored therein. In some embodiments, institution profiles 208 may be a structured data set configured to store data related to an issuing institution 104 or acquiring institution 110. Such an institution profile 208 may include, for instance, a unique identifier associated therewith that would be included in transaction messages for payment transactions involving the related institution, public and/or private keys of cryptographic key pairs associated with blockchain networks 112, network identifiers for blockchain networks 112, preferences regarding blockchain network 112 usage and/or settlement currency types, and other data as discussed herein.

The processing server 102 may include a querying module 218. The querying module 218 may be configured to execute queries on databases to identify information. The querying module 218 may receive one or more data values or query strings, and may execute a query string based thereon on an indicated database, such as the institution database 206 of the processing server 102 to identify information stored therein. The querying module 218 may then output the identified information to an appropriate engine or module of the processing server 102 as necessary. The querying module 218 may, for example, execute a query on the institution database 206 of the processing server 102 to identify a public key in an institution profile 208 for an acquiring institution 110 for use in generating a destination address for use in a blockchain transaction used for real-time settlement of a traditional payment transaction.

The processing server 102 may also include a generation module 220. The generation module 220 may be configured to generate data for use by the processing server 102 in performing the functions discussed herein. The generation module 220 may receive instructions as input, may generate data based on the instructions, and may output the generated data to one or more modules of the processing server 102. For example, the generation module 220 may be configured to generate blockchain addresses using public keys and suitable algorithms, generate digital signatures using private keys and suitable generation algorithms, generate transaction amounts in various currencies using exchange rates, generate transaction hash values using hashing algorithms, generate modified transaction messages, etc.

The processing server 102 may also include a validation module 222. The validation module 222 may be configured to perform validations and verifications for the processing server 102 as part of the functions discussed herein. The validation module 222 may receive instructions as input, which may include data to be validated and/or data to be used in the validation. The validation module 222 may perform a validation or verification as requested, and may output a result of the validation to another module or engine of the processing server 102. The validation module 222 may, for example, be configured to validate a transaction hash value received from an issuing institution 104 or node 114 in a blockchain network 112 as matching a reference hash value generated by the generation module 220 for confirmation of a settlement blockchain transaction.

The processing server 102 may also include a transmitting device 224. The transmitting device 224 may be configured to transmit data over one or more networks via one or more network protocols. In some instances, the transmitting device 224 may be configured to transmit data to issuing institutions 104, acquiring institutions 110, nodes 114 in blockchain networks 112, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to issuing institutions 104 and acquiring institutions 110 that are superimposed or otherwise encoded with transaction messages transmitted via payment rails, which may include transaction data for traditional payment transactions. The transmitting device 224 may also be configured to electronically transmit data signals to nodes 114 in blockchain networks 112 that are superimposed or otherwise encoded with blockchain transactions, which may include transaction amounts, unspent transaction outputs, digital signatures, destination addresses, and any other suitable values. The transmitting device 224 may also be configured to electronically transmit data signals to issuing institutions 104 and acquiring institutions 110 that are superimposed or otherwise encoded with information regarding institution profiles 208 associated therewith and the management thereof.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, additional blockchain data, hashing algorithms for generating blocks, credentials for validation, usage rule templates, communication data for blockchain nodes 114, communication data for issuing institutions 104 and acquiring institutions 110, transaction message formatting standards, signature generation and verification algorithms, address generation algorithms, etc.

Processes for Real-Time Settlement of Traditional Payment Transactions

FIGS. 3A and 3B illustrate an example process in the system 100 of FIG. 1 for the real-time settlement of a traditional payment transaction via use of a blockchain network 112 where the issuing institution 104 submits the blockchain transaction to the blockchain network 112.

In step 302, the acquiring institution 110 may submit a transaction request to the processing server 102 via payment rails associated with a payment network. The transaction request may be a request for authorization or other aspect of a traditional payment transaction and may be a transaction message formatting according to one or more standards governing the transmission of financial transaction messages. In step 304, the receiving device 202 of the processing server 102 may receive the transaction request. The transaction request may include at least payment credentials including an issuer identifier, an acquirer identifier, and a transaction amount. In step 306, the transmitting device 224 of the processing server 102 may forward the transaction request to the issuing institution 104 (e.g., identified using the issuer identifier) using the payment rails. In some instances, the processing server 102 may identify a unique transaction identifier that is inserted into the transaction request prior to forwarding.

In step 308, the issuing institution 104 may receive the transaction request. In step 310, the issuing institution 104 may approve the financial transaction, which may involve payment of the transaction amount from a transaction account associated with the consumer 106 (e.g., issued by the issuing institution 104) to a transaction account associated with the merchant system 108 (e.g., issued by the acquiring institution 110). Approval of the transaction may be based on any suitable considerations, such as the account balance for the consumer's transaction account or credit available thereto. As part of the approval of the transaction, the issuing institution 104 may generate a response message for the payment transaction that includes a response code indicating approval of the payment transaction. The response message may be a transaction message formatted according to the same standard used for the transaction request and include the same transaction data in addition to the response code.

In step 312, the issuing institution 104 may transmit the response message to the processing server 102 using the payment rails associated with the payment network. In step 314, the receiving device 202 of the processing server 102 may receive the response message. In step 316, the querying module 218 of the processing server 102 may execute a query on the institution database 206 of the processing server 102 to identify an institution profile 208 associated with the acquiring institution 110 by identifying the institution profile 208 that includes the acquirer identifier included in the response message. In step 318, the generation module 220 of the processing server 102 may generate a destination address for the blockchain network 112 using the public key stored in the identified institution profile 208. In cases where an institution profile 208 may include public keys for multiple blockchain networks 112, the processing server 102 may first select a blockchain network 112 based on preferences of the acquiring institution 110 and issuing institution 104 (e.g., as identified in related institution profiles 208).

After the address has been generated, in step 320, the transmitting device 224 of the processing server 102 may electronically transmit a settlement request to the issuing institution 104 using an alternative communication network (e.g., not the payment rails), such as the internet, a wide area network, etc. The settlement request may include at least the destination address, transaction amount (e.g., which may be the same as included in the response message or based thereon, such as using an exchange rate for a currency used by the selected blockchain network 112), and the transaction identifier. In step 322, the issuing institution 104 may receive the settlement request. In step 324, the issuing institution 104 may identify suitable unspent transaction outputs and generate a digital signature using its private key, which it may then include in a submission of a blockchain transaction to a node 114 in the selected blockchain network 112 for use as real-time settlement of the standard payment transaction.

The node 114 may confirm the blockchain transaction by validating the unspent transaction outputs, digital signature, and currency amounts, and include the blockchain transaction in a new block that is generated and confirmed by others nodes 114 in the blockchain network 112. In step 326, the issuing institution 104 may generate a confirmation hash value for the blockchain transaction, which may be a hash value generated by hashing the blockchain transaction and/or predetermined data included therein. In step 328, the issuing institution 104 may transmit the confirmation hash value to the processing server 102 using the alternative communication network.

In step 330, the receiving device 202 of the processing server 102 may receive the confirmation hash value from the issuing institution 104. In step 332, the transmitting device 224 of the processing server 102 may transmit the confirmation hash value to a node 114 in the blockchain network 112 in a request for confirmation of the blockchain transaction. In step 334, the receiving device 202 of the processing server 102 may receive a confirmation message from the node 114 that indicates if the confirmation was successful (e.g., a blockchain transaction added to the blockchain matches the confirmation hash value). In step 336, the generation module 220 of the processing server 102 may generate a modified transaction response message by including the confirmation hash value in a predetermined data element thereof. In step 338, the transmitting device 224 of the processing server 102 may transmit the modified transaction response message to the acquiring institution 110 using the payment rails associated with the payment network, for receipt by the acquiring institution 110, in step 340. The acquiring institution 110 may then finalize the payment transaction and settle the merchant system's transaction account accordingly.

FIG. 4 illustrates an alternative process in the system 100 of FIG. 1 for the real-time settlement of a traditional payment transaction via use of a blockchain network 112 where the processing server 102 submits the blockchain transaction to the blockchain network 112 in place of the issuing institution 104.

In step 402, the acquiring institution 110 may submit a transaction request to the processing server 102 via payment rails associated with a payment network. The transaction request may be a request for authorization or other aspect of a traditional payment transaction and may be a transaction message formatting according to one or more standards governing the transmission of financial transaction messages. In step 404, the receiving device 202 of the processing server 102 may receive the transaction request. The transaction request may include at least payment credentials including an issuer identifier, an acquirer identifier, and a transaction amount. In step 406, the transmitting device 224 of the processing server 102 may forward the transaction request to the issuing institution 104 (e.g., identified using the issuer identifier) using the payment rails. In some instances, the processing server 102 may identify a unique transaction identifier that is inserted into the transaction request prior to forwarding.

In step 408, the issuing institution 104 may receive the transaction request. In step 410, the issuing institution 104 may approve the financial transaction, which may involve payment of the transaction amount from a transaction account associated with the consumer 106 (e.g., issued by the issuing institution 104) to a transaction account associated with the merchant system 108 (e.g., issued by the acquiring institution 110). Approval of the transaction may be based on any suitable considerations, such as the account balance for the consumer's transaction account or credit available thereto. As part of the approval of the transaction, the issuing institution 104 may generate a response message for the payment transaction that includes a response code indicating approval of the payment transaction. The response message may be a transaction message formatted according to the same standard used for the transaction request and include the same transaction data in addition to the response code.

In step 412, the issuing institution 104 may transmit the response message to the processing server 102 using the payment rails associated with the payment network. In step 414, the receiving device 202 of the processing server 102 may receive the response message. In step 416, the querying module 218 of the processing server 102 may execute a query on the institution database 206 of the processing server 102 to identify an institution profile 208 associated with the issuing institution 104 using the issuer identifier for identification of a private key and unspent transaction outputs included therein, and for identification of an institution profile 208 associated with the acquiring institution 110 for identification of a public key included therein. In step 418, the generation module 220 of the processing server 102 may generate a digital signature using the private key of the issuing institution's institution profile 208 and may generate a destination address using the public key of the acquiring institution's institution profile 208.

In step 420, the transmitting device 224 of the processing server 102 may electronically transmit a blockchain transaction to a node 114 in the blockchain network 112. The blockchain transaction may include the digital signature and unspent transaction outputs, the destination address, and the transaction amount from the response message or another currency amount based thereon (e.g., exchanged by the generation module 220 using an exchange rate based on the currency of the blockchain network 112). In step 422, the receiving device 202 of the processing server 102 may receive a confirmation hash value from the node 114, which may be a value generated by the node 114 hashing the blockchain transaction added to the blockchain or predetermined transaction data included therein. In some embodiments, the processing server 102 may be configured to validate the confirmation hash by generating (e.g., using the generation module 220) its own hash value using the transaction data and validating (e.g., using the validation module 222) the hash values as matching.

In step 424, the generation module 220 of the processing server 102 may generate a modified transaction response message by inserting the confirmation hash value into a predetermined data element included therein. In step 426, the transmitting device 224 of the processing server 102 may electronically transmit the modified transaction response message to the acquiring institution 110 using the payment rails associated with the payment network. In step 428, the acquiring institution 110 may receive the modified response message and may finalize the payment transaction and settle the merchant system's transaction account accordingly.

Exemplary Method for Real-Time Settlement of Financial Institutions

FIG. 5 illustrates a method 500 for the real-time settlement of issuing and acquiring financial institutions in a standard electronic payment transaction via the use of a blockchain network in additional to traditional transaction messaging.

In step 502, a response message for a financial transaction may be received by a receiver (e.g., the receiving device 202) of a processing server (e.g., the processing server 102) from an issuing financial institution (e.g., the issuing institution 104) transmitted using payment rails, the response message including at least a transaction amount, issuer identification value, and acquirer identification value. In step 504, a query may be executed on a memory (e.g., the memory 226 or institution database 206) of the processing server by a processing device (e.g., the querying module 218) of the processing server to identify a public key associated with the acquirer identification value.

In step 506, a destination address may be generated by the processing device (e.g., the generation module 220) of the processing server using the identified public key. In one embodiment, step 504 may further include identifying a private key associated with the issuer identification value (e.g., in some cases, the keys may be components in separate cryptographic key pairs). In such an embodiment, step 506 may further include generating a digital signature using the identified private key. In step 508, a settlement request may be transmitted by a transmitter (e.g., the transmitting device 224) of the processing server to the issuing financial institution using an alternative communication network, the settlement request including at least the destination address, the transaction amount, and a transaction reference value. In some embodiments, step 508 may alternatively include transmitting a blockchain transaction request to a node (e.g., node 114) in a blockchain network (e.g., blockchain network 112) using an alternative communication network, the blockchain transaction request including at least the destination address, digital signature, transaction amount, and a transaction reference value.

In step 510, a transaction hash value may be received by the receiver of the processing server from the issuing financial institution in response to the settlement request. In some embodiments, the value may be received from the node in the blockchain network. In step 512, the response message may be modified by the processing device (e.g., the generation module 220) of the processing server to include the received transaction hash value and/or confirmation data based on the received transaction hash value. In step 514, the modified response message may be transmitted by the transmitter of the processing server to an acquiring financial institution (e.g., the acquiring institution 110) using the payment rails.

In one embodiment, the method 500 may further include: transmitting, by the transmitter of the processing server, the transaction hash value to a node in a blockchain network; and receiving, by the receiver of the processing server, the confirmation data from the node in the blockchain network. In some embodiments, the method 500 may also include: receiving, by the receiver of the processing server, a confirmation hash value from a node in a blockchain network; and validating, by the processing device of the processing server, that the transaction hash value matches the confirmation hash value prior to modifying the response message. In one embodiment, the transaction reference value may be included in the received response message.

Computer System Architecture

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3A, 3B, 4, and 5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3A, 3B, 4, and 5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for real-time settlement of financial institutions for a standard electronic payment transaction using a blockchain network. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for real-time settlement of financial institutions for a standard electronic payment transaction using a blockchain network, comprising:
   receiving, by a receiver of a processing server, a response message for a financial transaction from an issuing financial institution transmitted using payment rails, the response message including at least a transaction amount, issuer identification value, and acquirer identification value;
   in response to receiving the response message, determining, by a processing device of the processing server, real-time settlement of the financial transaction based on at least the one of the issuer identification value or the acquirer identification value;
   executing, by the processing device of the processing server, a query on a memory of the processing server to identify a public key associated with the acquirer identification value;
   generating, by the processing device of the processing server, a destination address using the identified public key;
   transmitting, by a transmitter of the processing server, a settlement request to the issuing financial institution using an alternative communication network, the settlement request including at least the destination address, the transaction amount, and a transaction reference value;
   receiving, by the receiver of the processing server, a transaction hash value from the issuing financial institution in response to the settlement request;
   modifying, by the processing device of the processing server, the response message to include the received transaction hash value and/or confirmation data based on the received transaction hash value; and
   transmitting, by the transmitter of the processing server, the modified response message to an acquiring financial institution using the payment rails.

2. The method of claim 1, further comprising:
   transmitting, by the transmitter of the processing server, the transaction hash value to a node in a blockchain network; and
   receiving, by the receiver of the processing server, the confirmation data from the node in the blockchain network.

3. The method of claim 1, further comprising:
   receiving, by the receiver of the processing server, a confirmation hash value from a node in a blockchain network; and
   validating, by the processing device of the processing server, that the transaction hash value matches the confirmation hash value prior to modifying the response message.

4. The method of claim 1, wherein the transaction reference value is included in the received response message.

5. The method of claim 1, further comprising:
   storing, in a memory of the processing server, a database, the database including an issuing financial institution profile and an acquiring institution profile, each of the issuing financial institution profile and the acquiring institution profile including one or more public keys each associated with a blockchain network, and a blockchain network preference;
   wherein the executing, by the processing device of the processing server, a query on a memory of the processing server to identify a public key associated with the acquirer identification value, includes:
     identifying, by the processing device of the processing server, a plurality of public keys associated with the acquirer identification value; and
     determining, by the processing device of the processing server, which of the plurality of public keys to use based on the blockchain network preference.

6. A method for real-time settlement of financial institutions for a standard electronic payment transaction using a blockchain network, comprising:
   receiving, by a receiver of a processing server, a response message for a financial transaction from an issuing financial institution transmitted using payment rails, the response message including at least a transaction amount, issuer identification value, and acquirer identification value;
   in response to receiving the response message, determining, by a processing device of the processing server, real-time settlement of the financial transaction based on at least the one of the issuer identification value or the acquirer identification value;
   executing, by the processing device of the processing server, a query on a memory of the processing server to identify a public key associated with the acquirer identification value and a private key associated with the issuer identification value;
   generating, by the processing device of the processing server, a destination address using the identified public key and a digital signature using the identified private key;
   transmitting, by a transmitter of the processing server, a blockchain transaction request to a node in a blockchain network using an alternative communication network, the blockchain transaction request including at least the destination address, digital signature, transaction amount, and a transaction reference value;
receiving, by the receiver of the processing server, a confirmation message from the node in the blockchain network, the confirmation message including a transaction hash value and/or confirmation data;
modifying, by the processing device of the processing server, the response message to include the received transaction hash value and/or confirmation data; and
transmitting, by the transmitter of the processing server, the modified response message to an acquiring financial institution using the payment rails.

7. The method of claim 6, further comprising:
generating, by the processing device of the processing server, the transaction hash value by applying a hashing algorithm to the blockchain transaction request, wherein
the response message includes the confirmation data.

8. The method of claim 6, wherein the transaction reference value is included in the received response message.

9. The method of claim 6, wherein the public key and private key are components in separate cryptographic key pairs.

10. The method of claim 6, further comprising:
storing, in a memory of the processing server, a database, the database including an issuing financial institution profile and an acquiring institution profile, each of the issuing financial institution profile and the acquiring institution profile including one or more public keys each associated with a blockchain network, and a blockchain network preference;
wherein the executing, by the processing device of the processing server, a query on a memory of the processing server to identify a public key associated with the acquirer identification value, includes:
identifying, by the processing device of the processing server, a plurality of public keys associated with the acquirer identification value; and
determining, by the processing device of the processing server, which of the plurality of public keys to use based on the blockchain network preference.

11. A system for real-time settlement of financial institutions for a standard electronic payment transaction using a blockchain network, comprising:
a receiver of a processing server configured to receive a response message for a financial transaction from an issuing financial institution transmitted using payment rails, the response message including at least a transaction amount, issuer identification value, and acquirer identification value;
a processing device of the processing server configured to:
in response to receiving the response message, determine real-time settlement of the financial transaction based on at least the one of the issuer identification value or the acquirer identification value;
execute a query on a memory of the processing server to identify a public key associated with the acquirer identification value, and
generate a destination address using the identified public key; and
a transmitter of the processing server configured to transmit a settlement request to the issuing financial institution using an alternative communication network, the settlement request including at least the destination address, the transaction amount, and a transaction reference value, wherein the receiver of the processing server is further configured to receive a transaction hash value from the issuing financial institution in response to the settlement request;
the processing device of the processing server is further configured to modify the response message to include the received transaction hash value and/or confirmation data based on the received transaction hash value; and
the transmitter of the processing server is further configured to transmit the modified response message to an acquiring financial institution using the payment rails.

12. The system of claim 11, wherein
the transmitter of the processing server is further configured to transmit the transaction hash value to a node in a blockchain network, and
the receiver of the processing server is further configured to receive the confirmation data from the node in the blockchain network.

13. The system of claim 11, wherein
the receiver of the processing server is further configured to receive a confirmation hash value from a node in a blockchain network, and
the processing device of the processing server is further configured to validate that the transaction hash value matches the confirmation hash value prior to modifying the response message.

14. The system of claim 11, wherein the transaction reference value is included in the received response message.

15. The system of claim 11, further comprising:
a memory of the processing server configured to store a database, the database including an issuing financial institution profile and an acquiring institution profile, each of the issuing financial institution profile and the acquiring institution profile including one or more public keys each associated with a blockchain network, and a blockchain network preference;
wherein the executing, by the processing device of the processing server, a query on a memory of the processing server to identify a public key associated with the acquirer identification value, includes:
identifying, by the processing device of the processing server, a plurality of public keys associated with the acquirer identification value; and
determining, by the processing device of the processing server, which of the plurality of public keys to use based on the blockchain network preference.

16. A system for real-time settlement of financial institutions for a standard electronic payment transaction using a blockchain network, comprising:
a receiver of a processing server configured to receive a response message for a financial transaction from an issuing financial institution transmitted using payment rails, the response message including at least a transaction amount, issuer identification value, and acquirer identification value;
a processing device of the processing server configured to:
in response to receiving the response message, determine real-time settlement of the financial transaction based on at least the one of the issuer identification value or the acquirer identification value;
execute a query on a memory of the processing server to identify a public key associated with the acquirer identification value and a private key associated with the issuer identification value, and generate a destination address using the identified public key and a digital signature using the identified private key; and a transmitter of the processing server configured to transmit a blockchain transaction request to a node in a blockchain network using an alternative communication network, the blockchain transaction request including at least the destination address, digital signature, transaction amount, and a transaction reference value, wherein the receiver of the processing server is further configured to receive a confirmation message from the node in the blockchain network, the confirmation message including a transaction hash value and/or confirmation data, the processing device of the processing server is further configured to modify the response message to include the received transaction hash value and/or confirmation data, and the transmitter of the processing server is further configured to transmit the modified response message to an acquiring financial institution using the payment rails.

17. The system of claim 16, wherein the processing device of the processing server is further configured to generate the transaction hash value by applying a hashing algorithm to the blockchain transaction request, and the response message includes the confirmation data.

18. The system of claim 16, wherein the transaction reference value is included in the received response message.

19. The system of claim 16, wherein the public key and private key are components in separate cryptographic key pairs.

20. The system of claim 16, further comprising:

a memory of the processing server configured to store a database, the database including an issuing financial institution profile and an acquiring institution profile, each of the issuing financial institution profile and the acquiring institution profile including one or more public keys each associated with a blockchain network, and a blockchain network preference;

wherein the executing, by the processing device of the processing server, a query on a memory of the processing server to identify a public key associated with the acquirer identification value, includes:

identifying, by the processing device of the processing server, a plurality of public keys associated with the acquirer identification value; and determining, by the processing device of the processing server, which of the plurality of public keys to use based on the blockchain network preference.

* * * * *